United States Patent

Aleman

Patent Number: 5,398,862
Date of Patent: Mar. 21, 1995

[54] APPARATUS AND METHOD FOR PROVIDING SHIELDED ATMOSPHERE FOR WELDING

[75] Inventor: Miguel Aleman, Los Teques, Venezuela

[73] Assignee: Intevep, S.A., Caracas, Venezuela

[21] Appl. No.: 141,865

[22] Filed: Oct. 22, 1993

[51] Int. Cl.⁶ .............................................. B23K 1/18
[52] U.S. Cl. ................................. 228/49.3; 228/219; 228/44.5; 269/48.1; 219/74
[58] Field of Search ................... 228/49.3, 44.5, 42, 228/212, 219; 219/60 R, 74, 61; 138/90; 29/272; 269/48.1, 43

[56] References Cited

U.S. PATENT DOCUMENTS

| | | | |
|---|---|---|---|
| 2,794,244 | 6/1957 | Uecker | 228/44.5 |
| 3,387,761 | 6/1968 | Pickard | 228/42 |
| 3,699,635 | 10/1972 | Bradley | 29/272 |
| 3,750,451 | 8/1973 | Nolan | 269/48.1 |
| 3,979,041 | 9/1976 | Kaneyama | 228/49.3 |
| 4,436,574 | 3/1984 | Long | 269/48.1 |
| 4,648,544 | 3/1987 | Puisais et al. | 228/49.3 |
| 4,741,473 | 5/1988 | Bennett | 228/49.3 |

FOREIGN PATENT DOCUMENTS

| | | | |
|---|---|---|---|
| 2607506 | 8/1977 | Germany | 269/48.1 |
| 0094795 | 7/1980 | Japan | 228/49.3 |

Primary Examiner—P. Austin Bradley
Assistant Examiner—James Miner
Attorney, Agent, or Firm—Bachman & LaPointe

[57] ABSTRACT

An apparatus for providing a gas shield includes two radially adjustable walls disposed in spaced relation to each other along a substantially common central axis, each wall including a plurality of radially oriented wall segments defining a substantially flat, round wall having a circumference; a wedge structure for radially displacing the plurality of radially oriented wall segments between an expanded position wherein the circumference of each wall is expanded and a withdrawn position wherein the circumference of each wall is withdrawn; and a conduit for introducing a shield gas into a space defined between the two radially adjustable walls.

25 Claims, 5 Drawing Sheets

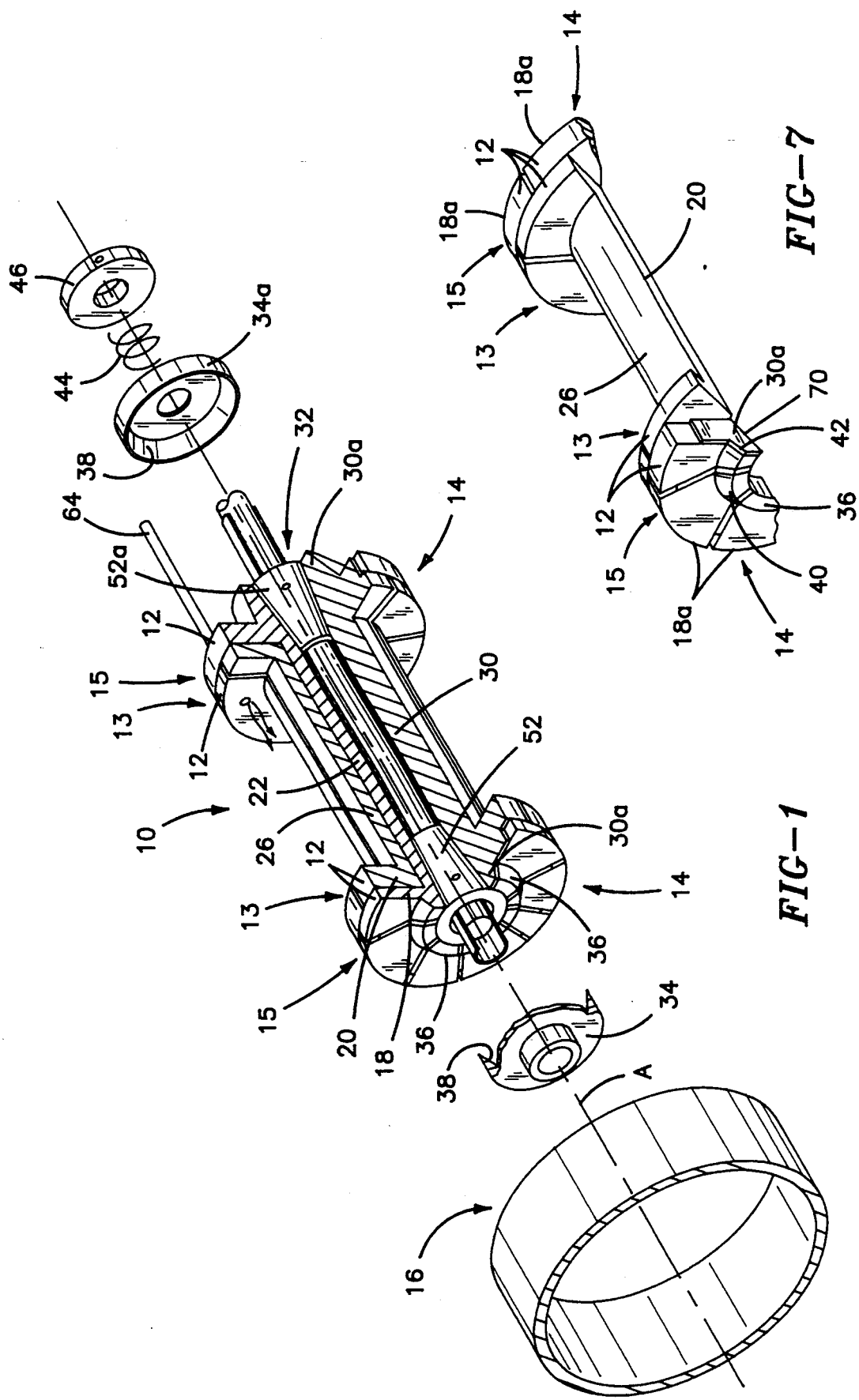

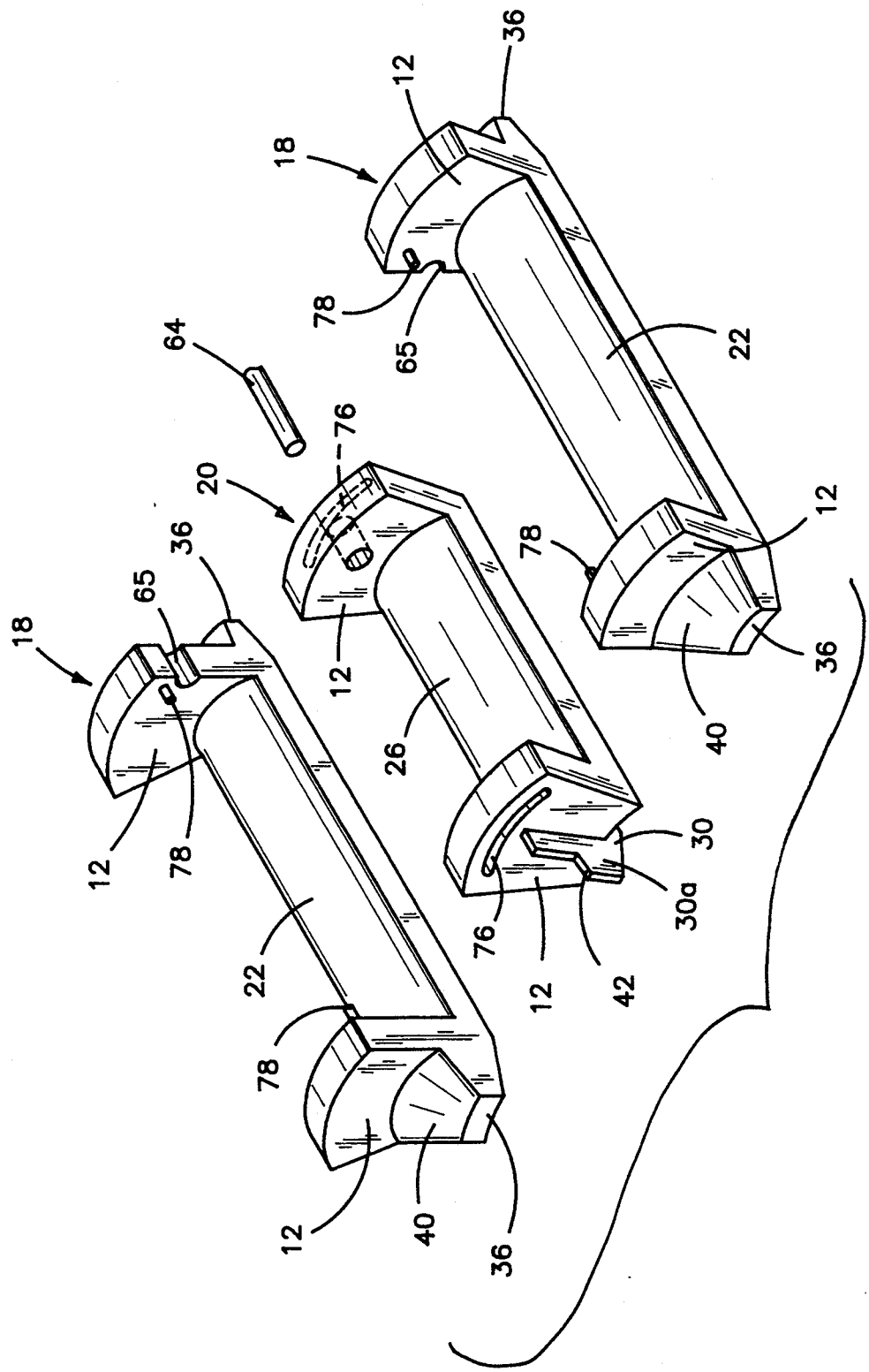

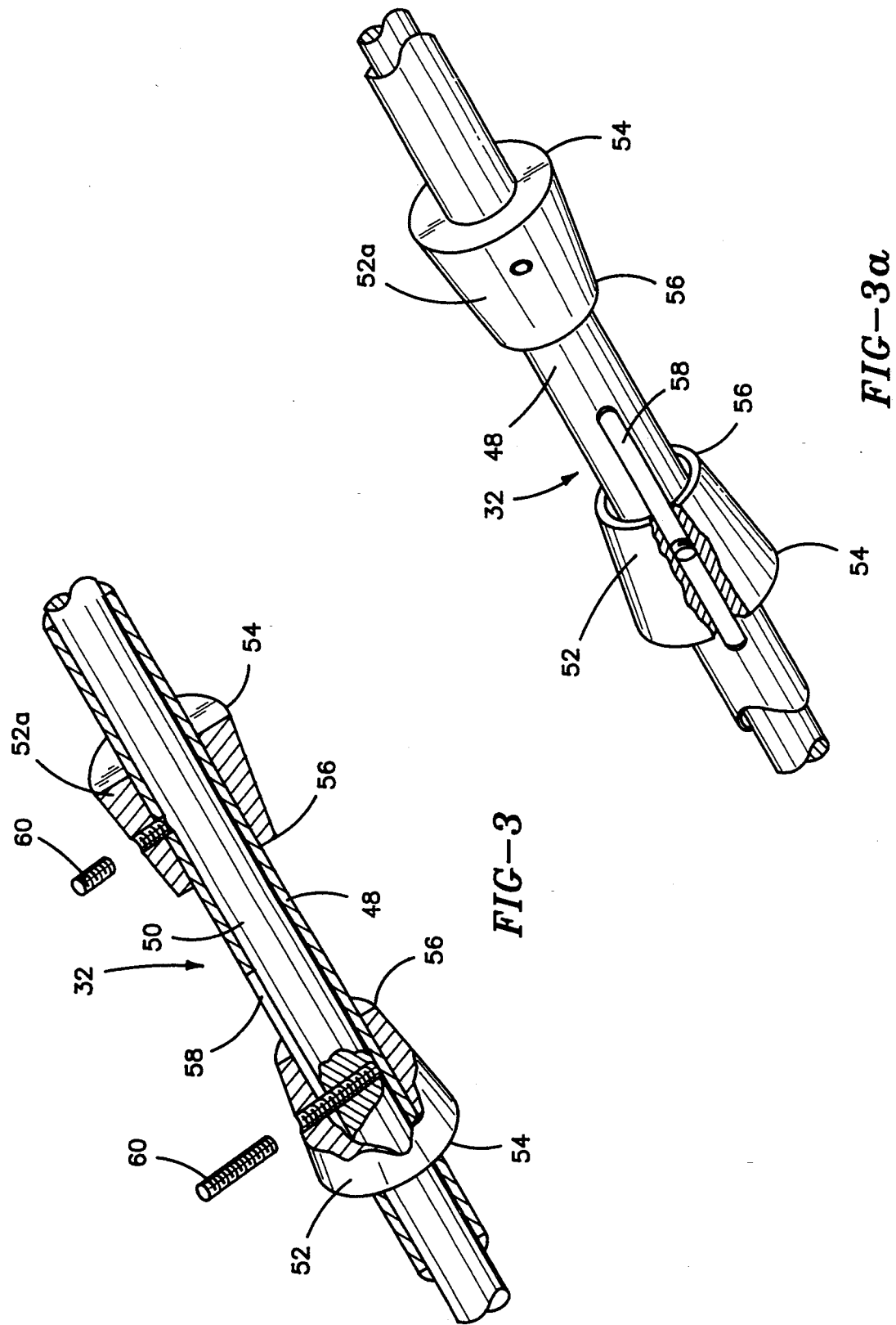

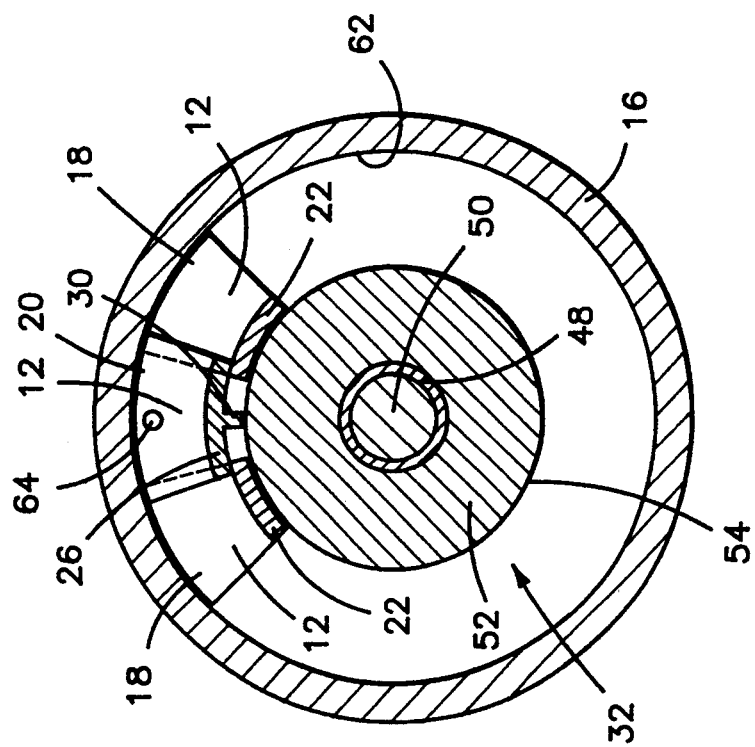
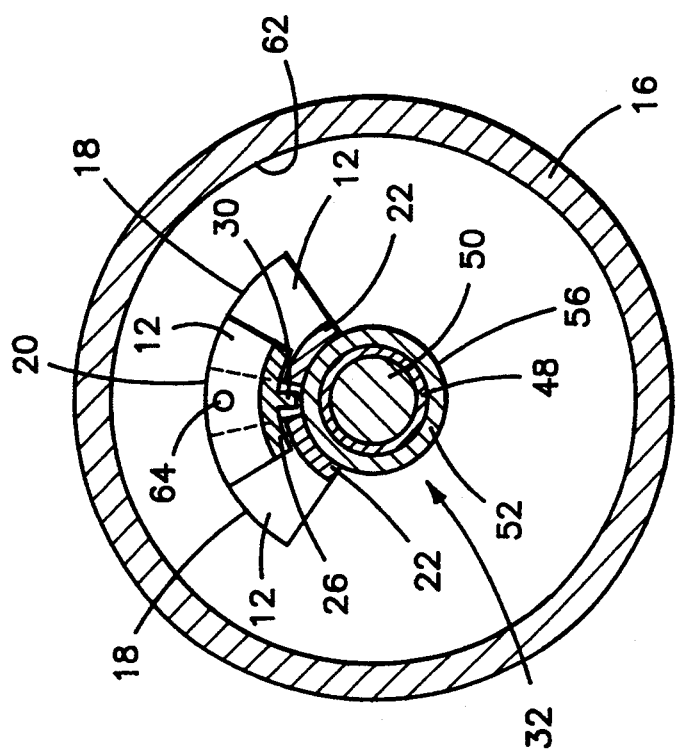

APPARATUS AND METHOD FOR PROVIDING SHIELDED ATMOSPHERE FOR WELDING

BACKGROUND OF THE INVENTION

The invention relates to the field of welding and, more particularly, to an apparatus for providing a shield, preferably an inert gas shield, at the reverse side or root side of a weld during welding.

During welding operations, a frequently occurring problem is the oxidation of the weld and the materials to be welded while these materials are at an increased temperature. It is known to prevent such oxidation by performing the welding operations in inert atmospheres. It is also known to attempt to prevent oxidation of the root side of a weld by supplying an inert atmosphere there as well.

Numerous patents disclose methods intended to effectively establish inert gas shielding atmospheres. Examples of such patents include U.S. Pat. No. 4,956,537, U.S. Pat. No. 3,450,857, U.S. Pat. No. 4,866,236, and numerous others. These patents typically disclose box-like structures which are rendered flexible to some extent to adapt to non-flat workpieces.

Co-pending and commonly assigned application Ser. No. 928,288 discloses an improved chamber for shielding such workpieces which provides enhanced flexibility of the box-like member or chamber and which therefore is more readily usable in numerous situations.

As regards the welding of tubular articles, of course, the root side to be shielded is on the inside of the tubular article. Traditionally, shielding could only be established in the tubular article by filling an entire section of the tubular article with inert gas which, as can be appreciated, leads to the use of an excessive amount of shield gas.

While the aforementioned patents provide shielding of a section of a workpiece, there is still a need for an apparatus which provides an effective shielding inert gas atmosphere in the inside of a tubular workpiece at the weld seam.

It is thus the principal object of the present invention to provide an apparatus for supplying an inert gas shielding atmosphere in the inside of a tubular workpiece at the point of the weld seam.

It is a further object of the invention to provide such an apparatus which is simple and reliable in manufacture and use.

It is a still further object of the present invention to provide such an apparatus which is readily adaptable to tubular articles of various size.

It is yet another object of the present invention to provide a method for shielding the root side of a weld seam of a tubular article which effectively prevents oxidation at the root side of the weld with an efficient use of shielding gas.

Other objects and advantages will appear hereinbelow.

SUMMARY OF THE INVENTION

The foregoing objects and advantages are readily obtained by the present invention.

According to the invention, an apparatus is provided which can be disposed within a tubular article to isolate a zone of the inner space of the tubular article. According to the invention, the apparatus is positioned so that the isolated zone encompasses the weld seam of the article where welding is to take place. Inert gas is supplied to the isolated zone so as to shield the root side of the weld at the weld seam and prevent oxidation of the weld seam and welded materials, thereby providing a weld of improved quality.

According to the invention, the apparatus comprises first and second radially adjustable walls disposed in spaced relation to each other along a substantially common central axis, each wall comprising a plurality of radially oriented wall segments defining a substantially flat, round wall having a circumference; means for radially displacing the plurality of wall segments between an expanded position wherein the circumference of each wall is expanded and a withdrawn position wherein the circumference of each wall is withdrawn; and means for introducing a shield gas into a space defined between the first and second radially adjustable walls.

At least a portion of corresponding wall segments of the first and second radially adjustable walls are preferably joined by base portions so as to define substantially U-shaped members.

The wall segments of each wall preferably overlap so as to define inner and outer wall portions. According to one embodiment of the invention, corresponding wall segments of outer wall portions are joined by base portions to form a first set of U-shaped members, and corresponding wall segments of inner wall portions are joined by base portions to form a second set of U-shaped members. Preferably, members of the first set of U-shaped members overlap members of the second set of U-shaped members so that each radially expandable wall remains substantially contiguous during adjustment of the circumference thereof. Members of the first and second sets are preferably arranged in alternating and overlapping relation to each other.

BRIEF DESCRIPTION OF THE DRAWINGS

A detailed description of the preferred embodiments of the invention follows, with reference to the accompanying drawings, wherein:

FIG. 1 is a partially exploded and partially sectional view of an apparatus according to the invention;

FIG. 2 is an exploded view of an embodiment of several elements of the apparatus of FIG. 1;

FIGS. 3 and 3a are partially sectional views of a shaft assembly according to the invention;

FIGS. 4 and 5 are sectional views showing an apparatus according to the invention in a withdrawn and expanded position;

FIG. 7 illustrates alternate embodiments of the invention.

DETAILED DESCRIPTION

Figure 6:
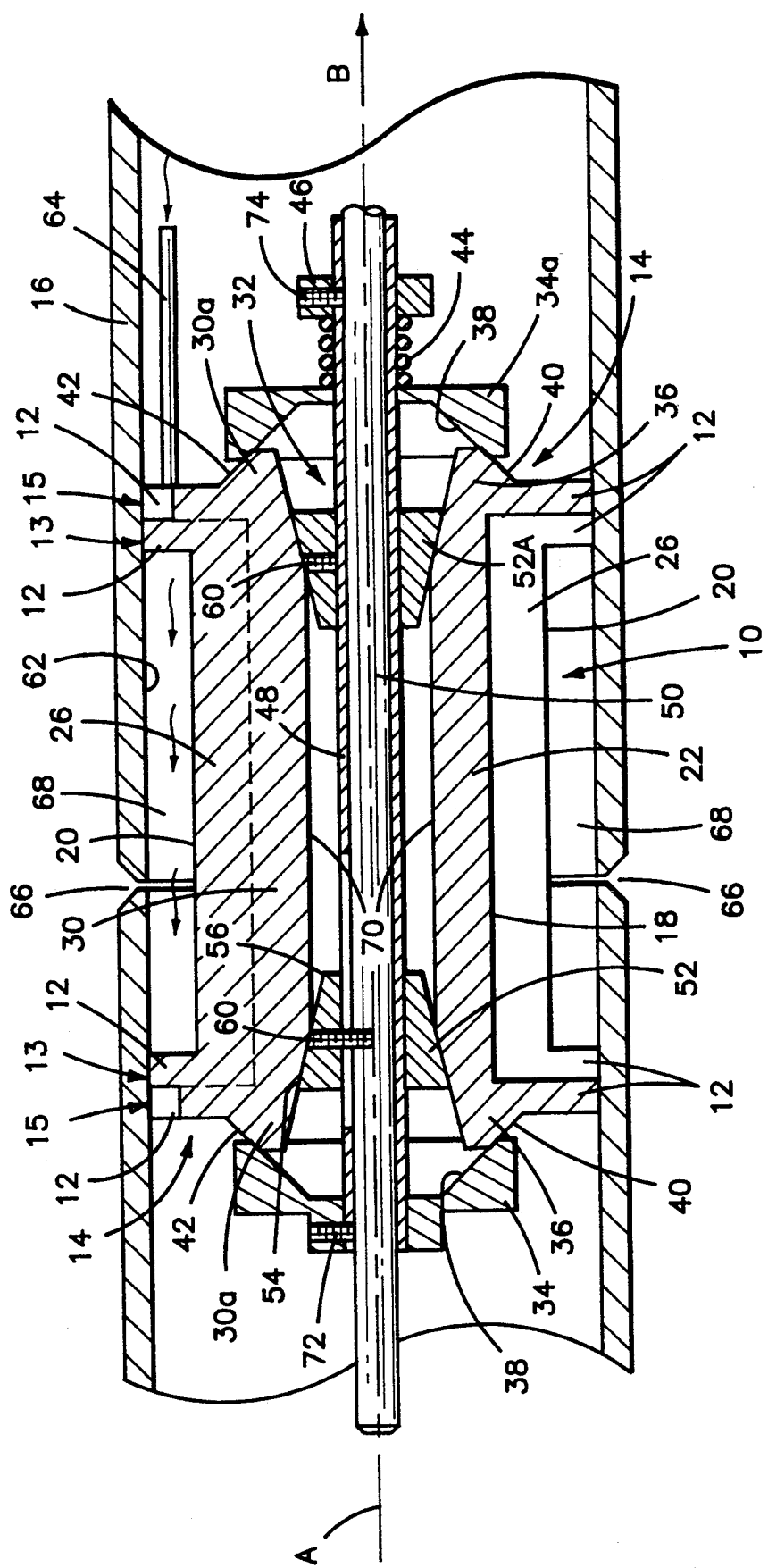
FIG. 6 is a sectional view of an apparatus according to the invention disposed for use within a tubular article.

The present invention relates generally to welding and particularly to an apparatus for shielding the root side of a weld seam of an article being welded, especially a tubular article. Shielding is provided in the form of an inert gas atmosphere such as that typically utilized in Tungsten Inert Gas (TIG) welding operations. Inert gas shielding helps to prevent undesirable oxidation of the weld seam and the workpiece when these materials are at elevated welding temperatures which frequently render the weld seam and workpiece materials susceptible to oxidation. Inert gas shielding substantially prevents oxidation and thereby provides a weld of improved quality.

Referring to FIG. 1, an apparatus according to the invention is generally referred to by reference numeral 10. As shown in FIG. 1, apparatus 10 has two radially adjustable walls 14 which are spaced along a substantially common central axis A. Each wall 14 is preferably defined by a plurality of radially oriented wall segments 12. Wall segments 12 are "radially oriented" in that they are loosely arranged or fanned around central axis A so as to define a generally round wall 14 having a circumference which can be adjusted by radially displacing the wall segments 12. Displacing segments 12 away from the central axis A expands the circumference of walls 14, while displacing segments 12 toward the central axis A reduces the circumference of walls 14.

According to the invention segments 12 are radially expandable so that they can be expanded within a tubular workpiece 16 to a location of relatively close proximity or contact with an inside surface of workpiece 16 so as to substantially isolate that portion of the inner space of workpiece 16. The isolated portion can then be flooded with an inert gas so as to provide a shielding atmosphere. The shielding atmosphere helps to prevent oxidation of the welding materials, thereby providing a weld of improved quality.

According to the invention, wall segments 12 of each wall 14 are arranged so as to overlap one another and to define inner 13 and outer 15 wall portions. Segments 12 of inner wall portion 13 are arranged adjacent to and offset from segments 12 of outer wall portion 15 so that segments 12 of inner wall portion 13 overlap the space between adjacent segments 12 of outer wall portion 15 and vice versa. This alternating overlapping arrangement of segments 12 allows walls 14 to remain substantially contiguous during adjustment of the circumference thereof.

At least a portion of corresponding wall segments 12 of walls 14 are preferably joined by base portions to provide intervening structure between walls 14. Segments 12 that are so joined generally define a substantially U-shaped member, wherein the arms of the U are corresponding wall segments 12 from each wall 14, and the base of the U is arranged substantially parallel to the central axis A.

FIG. 2 illustrates the configuration of three corresponding wall segments 12 joined by base portions 22, 26 to define U-shaped members.

As shown, corresponding segments 12 which define the outer wall portion 15 (FIG. 1) may be joined by base portions 22 to define a first set of generally U-shaped members 18. Corresponding segments 12 which define inner wall portions 13 (FIG. 1) may also preferably be joined by base portions 26 so as to define a second set of substantially U-shaped members 20. When radially oriented, base portions 22, 26 are generally aligned parallel with central axis A. Members 18, 20 preferably overlap one another, preferably in alternating order as shown, and are arranged so as to define substantially circular walls 14. Members 18, 20 arranged in this manner can be radially displaced to an expanded position wherein segments 12 of the inner 13 and outer 15 wall portions still substantially overlap so as to provide a substantially contiguous expanded wall 14. To this end, members 18 are preferably sized so as to receive or embrace members 20. That is, the inside contour of members 18 is preferably similar in shape and size to an outside contour of members 20.

As shown in FIG. 2, members 20 may preferably have a flange or plate 30 extending around at least a portion of an outer contour thereof. Flanges 30 preferably extend between adjacent members 18 so as to provide proper positioning of members 20 relative to members 18.

Returning to FIG. 1, members 18, 20 are preferably alternatingly arranged around a shaft structure 32 which, as will be discussed below, preferably includes structure for radially displacing segments 12 between an expanded and a withdrawn position.

Segments 12 may preferably be held in place on shaft structure 32 by at least one retaining member 34, preferably two caps or retaining members 34, 34a as shown. Caps 34, 34a serve to retain segments 12 in the desired radially oriented configuration. Segments 12 of members 18 preferably have projections 36 (also shown in FIG. 2) which extend from side surfaces thereof. Flanges 30 of members 20 also preferably have extending portions 30a. Caps 34, 34a preferably retain segments 12 of members 18, 20 in position by encompassing projections 36 and extending portions 30a.

Caps 34, 34a preferably have an inside diameter which is selected, in conjunction with the size of projections 36 and extending portions 30a, so as to provide a limit to the maximum radial expansion of segments 12.

Caps 34, 34a also preferably have a contoured or tapered inner surface 38, and projections 36 and extending portions 30a preferably have corresponding contoured or tapered surfaces 40, 42 (FIG. 2) respectively. Tapered inner surface 38 interacts with tapered surfaces 40, 42 so as to bias segments 12 into a withdrawn or reduced circumference position when caps 34, 34a or one cap 34a, is pressed or biased toward segments 12 of members 18, 20. As shown in FIG. 1, one cap 34a may be biased in this manner by being slidably mounted over shaft structure 32 and biased, for example, by spring 44 retained by ring 46 mounted to shaft structure 32.

FIGS. 3 and 3a illustrate a preferred embodiment of shaft structure 32. According to the invention, shaft structure 32 preferably includes an outer hollow shaft member 48 and an inner shaft member 50 slidably disposed within outer hollow shaft member 48.

Wedge members 52, 52a are preferably disposed on shaft structure 32 so as to interact with segments 12 of members 18, 20 in such a way that displacement of wedge members 52, 52a causes displacement of segments 12. As shown, wedge members 52, 52a may preferably be substantially conically shaped elements having an area or zone of large diameter 54 and an area or zone of small diameter 56. At least one wedge member 52 is slidably disposed on shaft structure 32 relative to segments 12 of members 18, 20. In this manner, sliding of wedge member 52 brings different portions of wedge 52, having different diameter, to bear upon segments 12 of members 18, 20 to thereby radially displace segments 12 as desired. Two wedges 52, 52a are preferably provided for contacting members 18, 20 at opposite ends or wall segments 12 thereof (See FIG. 6), so as to provide substantially uniform adjustment of the circumference of each of the two radially adjustable walls.

As shown in FIGS. 3, 3a, wedge members 52, 52a may preferably be disposed on shaft structure 32 in opposite relation to one another so that areas 56 of small diameter face one another. In this manner, wedge members 52, 52a can be brought together by sliding either or both of them toward the other so as to bring areas 54 of increased diameter to bear against relatively stationary segments 12 of members 18, 20 thereby forcing segments 12 radially outward to an expanded position. This operation of the shaft structure 32 and related elements will be more fully described below with reference to FIGS. 4 and 5.

Wedge members 52, 52a may preferably be slidably mounted relative to one another by fixing one wedge 52a to outer hollow shaft member 48 and slidably disposing the other wedge 52 over outer shaft member 48 and fixing wedge 52 to inner shaft member 50 through a groove or cutout 58 formed in outer shaft member 48. Wedges 52, 52a may be fixed to respective shaft members 48, 50 through any conventional means such as, for example, set screws 60. In the case of wedge 52, set screw 60 passes through cutout 58 and is driven into or against shaft 50. As is readily apparent, the desired drawing together and apart of wedge members 52, 52a is readily accomplished by sliding one shaft member relative to the other as appropriate. Such sliding may be accomplished manually or through any suitable and convenient conventional motive means (not shown). The actual means used to displace shaft members 48, 50 forms no part of this invention.

FIGS. 4 and 5 illustrate the operation of wedges 52, 52a to expand and withdraw segments 12 of members 18, 20 as desired. FIG. 4 shows segments 12 of members 18, 20 in a withdrawn position, wherein the area 56 of small or decreased diameter is brought to bear on segments 12. This withdrawn position is a typical starting position as the reduced circumference of walls 14 allows apparatus 10 to be readily inserted and disposed in a tubular article at the point where welding is to be carried out.

FIG. 5 illustrates an expanded position of segments 12 of members 18, 20. Wedge members 52, 52a have been drawn together so as to bring area 54 of increased diameter to bear, thereby forcing segments 12 of members 18, 20 radially outward to a position of contact or at least substantial proximity with an inside surface 62 of tubular workpiece 16. As shown, the overlap of adjacent segments 12 of members 18, 20 provides a substantially contiguous wall 14 despite the increase in circumference thereof. It should be noted that walls 14 need not be extended to sealing contact with inside surface 62. Rather, walls 14 need be expanded only to a point of substantial proximity with inside surface 62 so that escape of inert gas from apparatus 10 does not occur in prohibitive amounts.

Inert gas may be fed to the space between walls 14, that is, the zone within tubular article 16 which is isolated by apparatus 10, through any desired means such as, for example, a conduit 64 passing through one wall 14. Numerous conduits 64 may be provided if desired. Conduit 64 may be arranged to pass through a U-shaped member 20 to the isolated zone at a location on segment 12 of member 20 which is between adjacent U-shaped members 18 as shown. Conduit 64 may preferably be arranged above and aligned with flange 30 so that flange 30 serves as a stop to prevent adjacent members 18 from reaching a point of contact with and potential damage to conduit 64. If conduit 64 is to be of greater diameter than the thickness of flange 30, U-shaped members 18 which are to be adjacent to conduit 64 may be provided with cutouts 65 (FIG. 2) arranged to align with conduit 64 so that members 18 do not interfere with conduit 64, and vice versa, when apparatus 10 is in the withdrawn or closed position.

FIG. 6 is a lengthwise sectional view of an apparatus 10 according to the invention disposed for use within a tubular workpiece 16. The section is taken through a member 20 in the top portion (above axis A) and through a member 18 in the bottom portion (below axis A) to further illustrate the structure and overlap of these members and their interaction with caps 34, 34a and wedges 52, 52a. Inner shaft member 50 has been displaced in the direction of arrow B so as to radially expand walls 14 so as to provide a substantial seal on either side of a weld seam 66 of the tubular workpiece 16. Apparatus 10 serves to define a substantially isolated zone 68, as set forth above, encompassing weld seam 66 so that introducing inert gas through conduit 64 shields the root side of the weld from harmful oxidation.

It should be noted that the above described shaft structure 32 and orientation and operation of wedge members 52, 52a is a preferred embodiment. Any of numerous suitable structures could be utilized to radially displace segments 12 of U-shaped members 18, 20. For example, wedges 52, 52a could be mounted on a single shaft member in the same orientation (i.e., both small diameter 56 ends facing the same way). Longitudinal manipulation of the shaft along central axis A would provide the desired displacement of segments 12 of walls 14. Wedges 52, 52a could likewise be oriented in a reverse opposite orientation to that shown in the drawings. That is, areas 54 of increased diameter could be oriented facing inwardly, toward each other, so that spreading the wedges 52, 52a would expand members 18, 20.

Segments 12 and/or bases 22, 26 of U-shaped members 18, 20 preferably have a bottom surface 70 contoured to match the surface of wedge members 52, 52a. FIG. 2, illustrates such a matching contour for the preferred embodiment wherein areas 56 of reduced diameter face inwardly. FIG. 7 illustrates the opposite contour for members 18a, 20a which would be useful with areas 54 of increased diameter facing inwardly.

FIG. 7 also illustrates an alternate embodiment of the invention wherein only the corresponding segments 12 which define the inner wall portions 13 are joined by bases 26. Segments 12 of outer wall portions 15 in this embodiment have the form of individual wedge shaped members 18a which are disposed between flanges 30 of U-shaped members 20. In this embodiment, the structure of base 26 of members 20 is substantially simplified, as no overlapping of adjacent bases is required.

It should also be noted that, while some or all segments 12 are joined by bases to form a structure described herein as being generally U-shaped, similar shapes would, of course, be sufficient. Such other shapes would include any shape which provides two wall members or segments (arms) joined by some central structure.

Apparatus 10 may be readily assembled for use by positioning one cap 34 fixedly on outer hollow shaft 48. Cap 34 can conveniently be fixed to shaft 48 through any conventional means such as set screw 72 as shown in FIG. 6. Wedges 52, 52a can then be disposed on shaft structure 32, and segments 12 can be alternatingly oriented around wedges 52, 52a with projections 36 and extending portions 30a of segments 12 of one wall 14 disposed within cap 34. Remaining cap 34a may then suitably be slidably disposed on shaft structure 32 to encompass projections 36 and extending portions 30a of segments 12 of the other wall 14, followed by spring 44 and ring 46, which may be held in place by any conventional means such as set screw 74.

Assembled apparatus 10 is then, according to the invention, disposed within workpiece 16 in a position wherein walls 14 are arranged at either side of weld seam 66. Wedges 52, 52a are then manipulated as appropriate to expand walls 14 of apparatus 10, thereby providing a substantially isolated zone 68 into which inert gas can be introduced, for example through conduit 64, so as to provide a substantially inert shielding atmosphere at the root side of weld seam 66. When welding is completed and/or shielding is no longer necessary, wedges 52, 52a are further appropriately manipulated so as to allow walls 14 of apparatus 10 to return to a withdrawn or reduced circumference position. Walls of apparatus 10 may be biased to a withdrawn position by cap 34a which is biased against segments 12 by spring 44. Once walls 14 of apparatus 10 can be withdrawn, apparatus 10 can be readily removed from workpiece 16 and is ready for use in succeeding operations.

Returning to FIG. 2, a further embodiment will be described wherein additional structure is provided to hold segment 12 in the proper position during radial expansion and withdrawal. As shown in FIG. 2, wall segments 12 may be provided with grooves 76 and pins 78 which interlock to maintain proper positioning of adjacent wall segments 12 during expansion and withdrawal of radially adjustable walls 14. Grooves 76 in this embodiment preferably do not pass through the entire thickness of wall segments 12, and are preferably sufficiently deep to receive pins 78 therein. It should be noted that grooves 76 and pins 78 could be provided on wall segments 12 of either the inner 13 or outer 15 wall portions and also that it may be sufficient to provide grooves 76 and pins 78 on only one side or wall 14 of apparatus 10.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for providing a gas shield in a tubular article, comprising:
   first and second radially adjustable walls disposed in spaced relation to each other along a substantially common central axis, said first and second walls connected by a base portion, each wall comprising a plurality of wall segments defining a substantially flat round wall having a circumference, wherein adjacent wall segments of each of the first and second radially adjustable walls overlap so as to define inner and outer wall portions, said wall segments of said inner wall portions having flange members disposed along side surfaces thereof, and wherein wall segments of said outer wall portion are disposed between adjacent flange members; and
   means for radially displacing the plurality of wall segments between an expanded position wherein the circumference of each wall is expanded and a withdrawn position wherein the circumference of each wall is withdrawn.

2. An apparatus according to claim 1, wherein adjacent wall segments of each of the first and second radially adjustable walls overlap so as to define inner and outer wall portions, whereby the radially adjustable walls remain substantially contiguous when the circumference of each wall is expanded.

3. An apparatus according to claim 2, wherein corresponding wall segments of at least one of the inner and outer wall portions of the first and second radially adjustable walls are joined by base portions so as to define a plurality of substantially U-shaped members.

4. An apparatus according to claim 3, wherein the wall segments of the inner wall portion of the first and second radially adjustable walls are joined by base portions so as to define substantially U-shaped members, and wherein wall segments of the outer wall portion of the first and second radially adjustable walls include substantially wedge shaped members, and wherein the flange members position the wedge shaped members relative to the U-shaped members.

5. An apparatus according to claim 1, wherein the means for radially displacing the plurality of wall segments comprises at least one substantially conical wedge having a reduced diameter zone and an increased diameter zone, the wedge being positioned so as to contact the plurality of wall segments and being movable between an expanding position, wherein the increased diameter zone contacts the wall segments and displaces them into the expanded position, and a withdrawing position wherein the reduced diameter zone contacts the wall segments, thereby allowing them to return to the withdrawn position.

6. An apparatus according to claim 2, wherein corresponding wall segments of the inner and outer wall portions of the first and second radially adjustable walls are joined by base portions so as to define a plurality of substantially U-shaped members.

7. An apparatus according to claim 6, wherein wall segments and connecting bases of the outer wall portions of the first and second radially adjustable walls form a first set of U-shaped members and wherein wall segments and connecting bases of the inner wall portions of the first and second radially adjustable walls form a second set of U-shaped members, and wherein the first set of U-shaped members overlap the second set of U-shaped members.

8. An apparatus according to claim 7, wherein members of the first and second set of U-shaped members are arranged around the substantially common central axis in alternating relation.

9. An apparatus according to claim 8, further including positioning means disposed on members of the second set of U-shaped members for maintaining desired alternating relation between members of the first and second set of U-shaped members.

10. An apparatus according to claim 9, wherein the positioning means comprises substantially planar flanges extending from members of the second set of U-shaped members so as to extend between adjacent members of the first set of U-shaped members.

11. An apparatus according to claim 10, further including means, associated with members of the first and second sets of U-shaped members, for limiting radial displacement of and maintaining radial orientation of members of the first and second sets of U-shaped members.

12. An apparatus according to claim 11, wherein members of the first set of U-shaped members have projections on outer surfaces of respective wall segments, and wherein the substantially planar flanges of members of the second set of U-shaped members have projections extending along outer surfaces of wall segments thereof and further wherein the limiting means includes at least one cap member disposed so as to encompass the projections of the first and second sets of U-shaped members.

13. An apparatus according to claim 12, wherein the at least one cap member comprises a first cap member and a second cap member disposed adjacent to the first and second radially adjustable walls, and wherein each cap member has an inner contour selected so as to interact with projections of the first and second sets of U-shaped members and to limit a maximum radial expansion of the first and second radially adjustable walls.

14. An apparatus according to claim 13, wherein the means for radially displacing the plurality of wall segments comprises at least one substantially conical wedge having a reduced diameter zone and an increased diameter zone, the wedge being positioned so as to contact members of the first and second U-shaped members, the wedge being movable between an expanding position, wherein the increased diameter zone contacts the members of the first and second sets of U-shaped members and displaces the wall segments to the expanded position, and a withdrawing position wherein the reduced diameter zone contacts the members of the first and second sets of U-shaped members, thereby allowing the wall segments to return to the withdrawn position.

15. An apparatus according to claim 14, wherein the means for radially displacing includes two substantially conical wedges which contact bottom surfaces of members of the first and second sets of U-shaped members at opposite ends thereof so as to provide substantially uniform adjustment of the circumference of each of the two radially adjustable walls.

16. An apparatus according to claim 15, wherein the two cap members are disposed on a shaft means with members of the first and second sets of U-shaped members disposed between the two cap members, and wherein the two substantially conical wedges are disposed on the shaft means so that at least one of the two substantially conical wedges is movable along the shaft means relative to members of the first and second sets of U-shaped members.

17. An apparatus according to claim 16, wherein the shaft means comprises two telescoping shaft elements, and wherein the two substantially conical wedges are mounted on respective shaft elements, in opposite relation, whereby sliding of one shaft element relative to the other provides adjustment of the circumference of the radially adjustable walls.

18. An apparatus according to claim 17, wherein at least one cap of the two cap members is movably mounted relative to the members of the first and second sets of U-shaped members, and wherein the inner contour of the at least one cap is tapered, and further including means for biasing the at least one cap toward respective members of the first and second sets of U-shaped members, so that when the two substantially conical wedges are in the withdrawing position, the at least one cap urges members of the first and second sets of U-shaped members toward the withdrawn position, thereby providing a reduced circumference of the first and second radially adjustable walls.

19. An apparatus according to claim 18, wherein the two telescoping shaft elements include a first shaft element comprising a substantially hollow tube, and a second shaft element slidably disposed within the first shaft element.

20. An apparatus according to claim 19, wherein the two substantially conical wedges include a first substantially conical wedge fixed to the first shaft element, and a second substantially conical wedge slidably disposed over the first shaft element and fixed to the second shaft element through a longitudinal slot provided in the first shaft element.

21. An apparatus according to claim 20, wherein the two cap members include a first cap member fixed to the first shaft element adjacent to the first radially adjustable wall, and a second cap member slidably disposed on the first shaft element and biased by the biasing means against the second radially adjustable wall.

22. An apparatus according to claim 1, further including means for introducing a shield gas through one of the two radially adjustable walls to a space defined between the two radially adjustable walls.

23. An apparatus for providing a gas shield in a tubular article, comprising:

first and second radially adjustable walls disposed in spaced relation to each other along a substantially common central axis, each wall comprising a plurality of wall segments defining a substantially flat, round wall having a circumference, wherein adjacent wall segments of each of the first and second radially adjustable walls overlap so as to define inner and outer wall portions, wherein the wall segments of the inner wall portion of the first and second radially adjustable walls are joined by base portions so as to define substantially U-shaped members, wherein wall segments of the outer wall portion of the first and second radially adjustable walls include substantially wedge shaped members, and wherein the apparatus further includes means for positioning the wedge shaped members relative to the U-shaped members, said means for positioning comprising a plurality of flange members disposed along side surfaces of wall segments of the U-shaped members, said wedge shaped members being disposed between adjacent flange members; and means for radially displacing the plurality of wall segments between an expanded position wherein the circumference of each wall is expanded and a withdrawn position wherein the circumference of each wall is withdrawn.

24. An apparatus for providing a gas shield at the weld seam of a tubular article to be welded, comprising:

first and second radially adjustable walls disposed in spaced relation to each other along a substantially common central axis, said first and second walls connected by a base portion, each wall comprising a plurality of wall segments defining a substantially flat, round wall having a circumference, wherein adjacent wall segments of each of the first and second radially adjustable walls overlap so as to define inner and outer wall portions, said wall segments of said inner wall portions having flange members disposed along side surfaces thereof, and wherein wall segments of said outer wall portion are disposed between adjacent flange members;

means for radially displacing the plurality of wall segments so as to selectively adjust the circumference of the first and second radially adjustable walls between a withdrawn position, wherein the apparatus can be freely moved within the tubular article, and an expanded position wherein the first and second radially adjustable walls are urged toward an inside surface of the tubular article, one on each side of the weld seam, so as to provide a substantially sealed zone within the tubular article encompassing the inside surface of the tubular article at the weld seam; and means for introducing a shield gas into the substantially sealed zone.

25. A method for providing an inert gas shield within a tubular article to be welded, comprising the steps of:

providing a shield member comprising first and second radially adjustable walls disposed in spaced relation to each other along a substantially common central axis, each wall comprising a plurality of wall segments defining a substantially flat, round wall having a circumference, wherein adjacent wall segments of each of the first and second radially adjustable walls overlap so as to define inner and outer wall portions, said wall segments of said inner wall portions having flange members disposed along side surfaces thereof, and wherein wall segments of said outer wall portion are disposed between adjacent flange members;

positioning the shield member within the tubular article so that the first and second radially adjustable walls encompass a portion of the tubular article to be welded;

radially displacing the plurality of wall segments so as to selectively adjust the circumference of the first and second radially adjustable walls to an expanded position so as to provide a substantially sealed zone within the tubular article encompassing the inside surface of the tubular article corresponding to the portion of the tubular article to be welded; and introducing a shield gas into the substantially sealed zone so as to provide a shielded atmosphere at the portion of the tubular article to be welded.

* * * * *

UNITED STATES PATENT AND TRADEMARK OFFICE
CERTIFICATE OF CORRECTION

PATENT NO. : 5,398,862
DATED : MARCH 21, 1995
INVENTOR(S) : MIQUEL ALEMAN

It is certified that error appears in the above-indentified patent and that said Letters Patent is hereby corrected as shown below:

IN COLUMN 11, CLAIM 25, LINE 15, AFTER "AXIS", BUT BEFORE THE ","
INSERT --SAID FIRST AND SECOND WALLS CONNECTED BY A BASE PORTION--.

IN COLUMN 11, CLAIM 25, LINE 15, AFTER THE "," DELETE "HAS BEEN
INSERTED AFTER "CENTRAL AXIS,"".

Signed and Sealed this

Seventh Day of November, 1995

Attest:

BRUCE LEHMAN

*Attesting Officer*     *Commissioner of Patents and Trademarks*